W. B. WOODS.
NUT LOCK.
APPLICATION FILED JULY 5, 1911.
1,028,806.
Patented June 4, 1912.
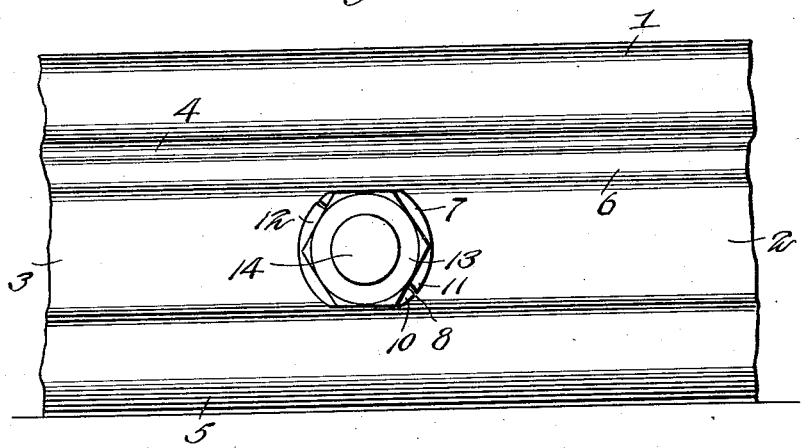
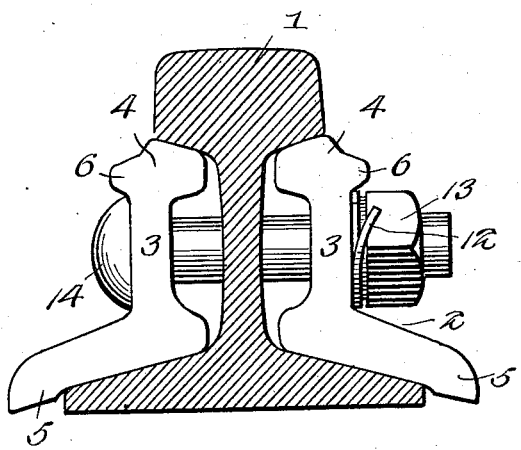
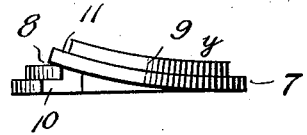
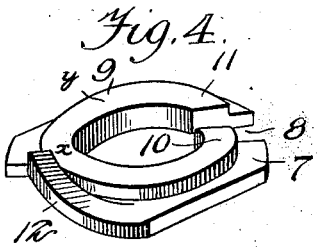
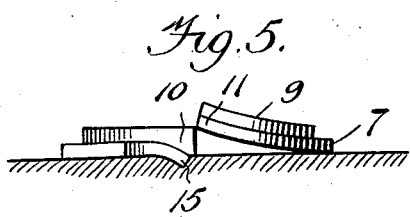
Witnesses
Inventor
William B. Woods
By Victor J. Evans
Attorney

UNITED STATES PATENT OFFICE.

WILLIAM B. WOODS, OF BALTIMORE, MARYLAND.

NUT-LOCK.

1,028,806.  Specification of Letters Patent.  Patented June 4, 1912.

Application filed July 5, 1911. Serial No. 636,876.

*To all whom it may concern:*

Be it known that I, WILLIAM B. WOODS, a citizen of the United States, residing at Baltimore, in the State of Maryland, have invented new and useful Improvements in Nut-Locks, of which the following is a specification.

This invention relates to nut locks and more particularly to that type which are adapted to be used in connection with rail joints or the like.

One of the principal objects of the invention is the provision of a device of this character which can be produced at a relatively low cost, so that the same can be adopted by the railroads without entailing great expense.

A further object of the invention is the provision of a nut of the Verona type having means for preventing the nut from turning relatively to the washer which is independent of the inherent resiliency of the washer itself, the washer being of such size as to lie between the upper and lower flanges of the fish plate and engage the same, so as to prevent turning with relation to the bolt.

Further objects of the invention will appear as the following specific description is read in connection with the accompanying drawing, which forms a part of this application, and in which:—

Figure 1 is a side elevation of a section of a rail. Fig. 2 is a section through the rails showing the device in edge elevation. Figs. 3 and 4 are side elevational and perspective views, respectively, of the nut lock removed from the bolt. Fig. 5 is side elevation showing a modified form of nut lock.

Referring more particularly to the drawing, 1 represents an ordinary rail and 2 the ordinary type of fish plate now used in connecting the ends of the rails together. This fish plate is provided with a web 3, a head 4 and a base flange 5. The head 4 extends upon opposite sides of the web and forms a shoulder 6, while the base flange 5 forms another shoulder, which shoulders are adapted to be engaged by the sides of the nut lock, as will be hereinafter described.

The nut lock comprises an annular substantially flat member 7 which is split, as shown at 8, and is provided with an annular raised boss 9. The two terminal ends of the device are indicated at 10 and 11 and lie in different planes, shown in Figs. 3 and 4. The end 11 is raised above the end 10, the inclination of the same being started at a point indicated by X and continuing from a point marked Y on a gradual curve upward, as shown. This not only binds upon the nut from the point X to the end 11 but also produces an arc from the point Y to the end 11 which must necessarily be flattened out when the nut is driven home, thereby increasing the spring pressure against the nut, the flat member 7 adding to the raised boss 9. The outlying flange beyond the boss is shown to have a tongue 12 bent up therefrom and extending on the arc of a circle from the general plane of the device to its terminal end which is raised approximately an eighth of an inch or more above the top of the boss 9. This tongue has sufficient resiliency to be depressed each time the corner of the polyhedral nut 13 passes over the same and to engage the sides thereof to prevent the same from turning relatively to the nut lock. Opposite sides of the washer are flattened so as to engage the shoulder 6 or the base flange, or both of them, whereby the washer is prevented from turning with relation to the bolt 14.

In the modification shown in Fig. 5, the lower terminal of the split ring has a depending projection 15, as shown. This type of washer is only used when the device is applied to bolts where the nut ordinarily rests upon wood. The construction is such that the depending projection will be forced into the wood and being embedded therein will prevent the nut lock from turning.

Having thus described the invention, what I claim as new is:—

1. A nut lock comprising a split washer having one of its legs inclined and terminating above the other, said inclination being on a gradual curve from a point intermediate the length of the inclination.

2. A nut lock comprising a split washer having one of its legs terminating above the other and inclined upon a gradual curve from a point intermediate the length of the leg, and a spring tongue struck up from the washer opposite the terminal end of the inclined leg and having its terminal end lying above the normal plane of the washer and substantially in a plane with the terminal end of the inclined leg.

3. A nut lock comprising a split washer having one leg inclined on a curve, a base flange, and a locking tongue struck up from the flange and having its terminal end projecting above the washer.

4. A nut lock comprising a split washer having a portion thereof inclined from the normal horizontal plane on the arc of a circle whose axis is horizontal, a base flange, and a locking tongue struck up from the flange and having its terminal end projecting above the washer.

5. A nut lock comprising a split washer having one of its legs circumferentially curved, a base flange, and a locking tongue struck up from the flange and having its terminal end projecting above the washer.

6. A nut lock comprising a split washer having a bolt opening, said washer increasing in thickness toward said bolt opening, a locking tongue struck up from the washer and arranged concentric with the bolt opening, said tongue having its terminal end lying substantially in a plane with one of the ends of said split washer and out of the normal plane of the device.

In testimony whereof I affix my signature in presence of two witnesses.

WILLIAM B. WOODS.

Witnesses:
E. EDMONSTON, Jr.,
E. HENEN TALBERT.

---

Copies of this patent may be obtained for five cents each, by addressing the "Commissioner of Patents, Washington, D. C."